Patented July 23, 1929.

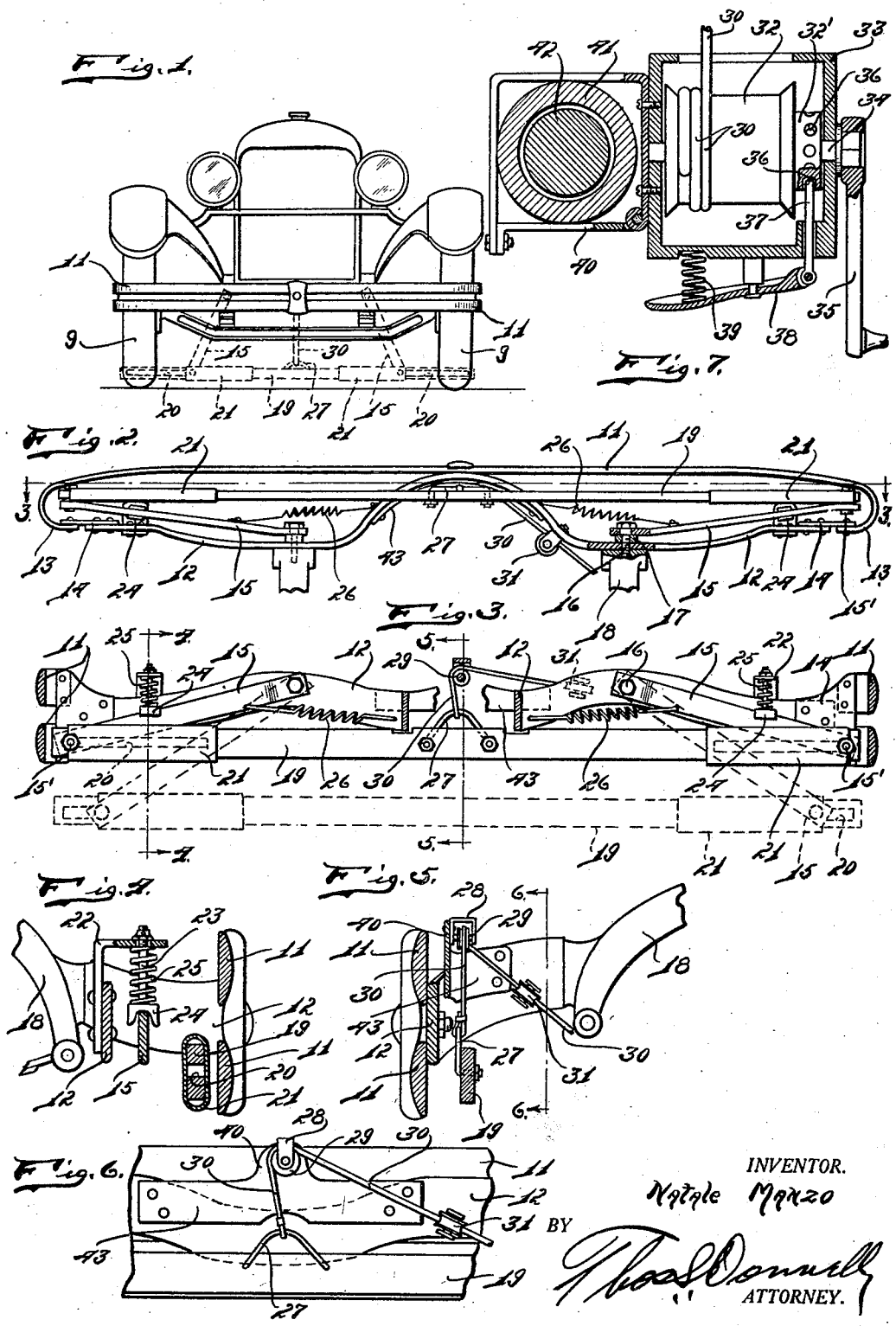

1,722,004

UNITED STATES PATENT OFFICE.

NATALE MANZO, OF DETROIT, MICHIGAN.

VEHICLE SAFETY BUMPER.

Application filed February 18, 1929. Serial No. 340,783.

My invention relates to a new and useful improvement in a vehicle safety bumper and has for its object the provision of a device which may be attached on the usual vehicle bumper in such a position as to be concealed by the bumper and so arranged and constructed as to be movable easily and quickly into operative position for preventing objects from being run over by the vehicle.

It is another object of the present invention to provide a device of this class which will be simple in structure, economical of manufacture and highly efficient in use.

Another object of the invention is the provision in a safety bumper of this class of means for supporting the bumper in inoperative position.

Another object of the invention is the provision of a shield at each side of the safety bumper for preventing accumulation of dirt and foreign material to such an extent to render the bumper inoperative.

Other objects will appear hereinafter.

The invention consists in the combination and arrangement of parts hereinafter described and claimed.

The invention will be best understood by a reference to the accompanying drawings which form a part of this specification, and in which, Fig. 1 is a front elevational view of a vehicle showing the invention applied.

Fig. 2 is a bottom plan view of the invention.

Fig. 3 is a view taken on line 3—3 of Fig. 2.

Fig. 4 is a view taken on line 4—4 of Fig. 3.

Fig. 5 is a view taken on line 5—5 of Fig. 3.

Fig. 6 is a view taken on line 6—6 of Fig. 5.

Fig. 7 is a sectional view through the vehicle steering post and column illustrating the raising mechanism.

In the drawings, I have illustrated the invention used with a vehicle having traction wheels 9 across which extends the usual type of bumper 11 having a central rear bar 12 secured to the inwardly turned ends 13 of the bumper bars 11 by the plate 14. The mountings at opposite ends of the safety bumper are the same so that a description of one will suffice for both. An arm 15 is pivotally mounted at one end on a bolt 16 which is projected through the spacing block 17, the rear bar 12 and threaded into the supporting brackets 18 on which the bumper is carried. The opposite end of the bar 15 is pivotally connected to the safety bumper bar 19 by means of a bolt projected through an elongated slot 20 formed in the bar 19. This bolt 15 also extends through a sleeve 21 which is slidably mounted on the bar 19 so that when the bar 19 is raised to inoperative position, the sleeve 21 serves as a seal to inclose and cover the slot 20 so that accumulation of dirt and other foreign material in the slot is prevented.

Mounted on the bar 12 and projecting forwardly therefrom is an L-shaped bracket 22 through which slidably is extended a bolt 23 carrying a bifurcating head 24 which is adapted to engage the upper edge of the arm 15 when it is moved to inoperative position. A spring 25 embraces the bolt 23 and serves to press the head 24 against the bar 15. Springs 26 connect each of the bars 15 to the bar 12.

Secured to the center of the bar 19 is a bail or hook 27 to which is fastened one end of a cord 30 which passes over a pulley 29 carried by the bracket 28, which is mounted upon the lug 40 projecting upwardly from the plate 43 which is mounted on the bar 12. The cord 30 also passes around a roller 31 which is carried by the bar 12. From this position, the cord 30 is led to the roller 32 which is mounted on the shaft 34 journaled in the supporting bracket or housing 33. A band 40 is attached to the housing 33 and clamped about the steering column 41 through which the steering post 42 projects, thus securing the housing 33 in a position easily accessible to the driver of the vehicle. The roller or drum 32 is provided with a hub 32' in which are formed a plurality of holes or notches 36. A slidably mounted locking finger 37 is pivotally connected at one end to the rockably mounted release arm 38, rocking of which is normally resisted by the spring 39. A crank 35 is mounted upon and adapted to rotate the shaft 34 for rotation in unison with the roller or drum 32.

In operation, after the bar 19 has been moved to operative position as shown in dotted lines in Fig. 1, the cord 30 may be wound on the roller 32 by means of the crank 35, thus bringing the bar 19 into position rearwardly of the bars 11 so as to be normally concealed from view at the front of the vehicle by these bars. When the bar 19 is brought into raised position, the springs 25 are placed under tension by being compressed. The springs 26 are also placed under tension because of being stretched. When sufficient of the cord 30 has been wound on the roller 32 to bring the bar 19 into the desired position, the locking finger 37 will serve to lock these parts in position of inoperativeness. The operator, by pressing the arm 38, will release the bar 19 for movement into operative position, this movement being effected by gravity and by assistance of the springs 25 and 26.

Thus, there is provided on a vehicle a safety bumper which will not alter or change the normal appearance of the bumper and which will permit the operator of the vehicle to guard against accidents and prevent running over objects. Particularly is this device useful in emergency when a pedestrian has been struck or when it appears imminent that the pedestrian is to be struck by the vehicle.

While I have illustrated and described the preferred form of my invention, I do not wish to limit myself to the precise details of structure shown but desire to avail myself of such variations and modifications as come within the scope of the appended claims.

Having thus described my invention what I claim as new and desire to secure by Letters Patent is:

1. A vehicle safety bumper of the class described adapted for use with a vehicle having a bumper mounted thereon comprising: a bumper bar; arms pivotally mounted at one end on said bumper and pivotally connected at the opposite ends to opposite ends of said movable bumper bar, said bumper bar having elongated slots at the point of connection with said arms; and a sleeve embracing said bumper bar at each end and slidable upon relative movement of said arms and said bumper bar.

2. A vehicle safety bumper of the class described adapted for use with a vehicle having a bumper mounted thereon comprising: a bumper bar; means for mounting said bumper bar movably on said bumper, said bumper bar being concealed rearwardly of said bumper upon movement to inoperative position; a rotatable member; a cord attached to said bumper bar and windable on said rotatable member for moving said bumper bar to inoperative position.

3. A vehicle safety bumper of the class described adapted for use with a vehicle having a bumper mounted thereon comprising: a bumper bar; means for mounting said bumper bar movably on said bumper, said bumper bar being concealed rearwardly of said bumper upon movement to inoperative position; a rotatable member; a cord attached to said bumper bar and windable on said rotatable member for moving said bumper bar to inoperative position; and releasable means for locking said rotatable member against rotation.

4. A vehicle safety bumper of the class described adapted for use with a vehicle having a bumper mounted thereon comprising: a bumper bar; means for mounting said bumper bar movably on said bumper, said bumper bar being concealed rearwardly of said bumper upon movement to inoperative position; a rotatable member; a cord attached to said bumper bar and windable on said rotatable member for moving said bumper bar to inoperative position; releasable means for locking said rotatable member against rotation; and resilient means engageable with and compressible by said bumper bar upon movement of the same to inoperative position.

In testimony whereof I have signed the foregoing specification.

NATALE MANZO.